Figure 1:
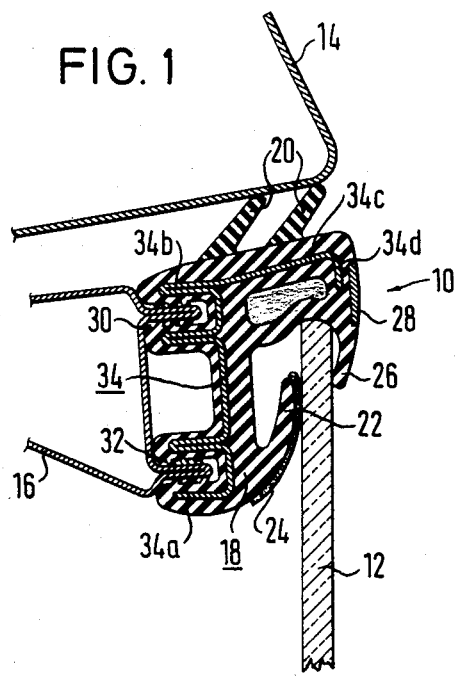

United States Patent [19]

Brachmann

[11] Patent Number: 4,656,784
[45] Date of Patent: Apr. 14, 1987

[54] DEVICE FOR THE SIMULTANEOUS SEALING OF THE WINDOW PANE OF A DOOR AND THE ROOF OF A MOTOR VEHICLE

[75] Inventor: Walter Brachmann, Nonnenhorn, Fed. Rep. of Germany

[73] Assignee: Sigri GmbH, Meitingen, Fed. Rep. of Germany

[21] Appl. No.: 799,633

[22] Filed: Nov. 19, 1985

[30] Foreign Application Priority Data

Nov. 19, 1984 [DE] Fed. Rep. of Germany ....... 3442241

[51] Int. Cl.$^4$ .............................................. E06B 7/16
[52] U.S. Cl. ...................................... 49/491; 49/440; 49/441; 49/374
[58] Field of Search ................. 49/374, 440, 441, 394, 49/360

[56] References Cited

U.S. PATENT DOCUMENTS 2,687,914  8/1954  Schrum ................................... 49/494
2,734,765  2/1956  Henderson et al. ............... 49/460 X
4,454,688  6/1984  Rest et al. .......................... 49/491 X
4,490,942  1/1985  Arnheim et al. ...................... 49/374

Primary Examiner—Kenneth Downey
Attorney, Agent, or Firm—Herbert L. Lerner; Laurence A. Greenberg

[57] ABSTRACT

A device for the simultaneous sealing of the window pane of a door and the region between the upper edge of the door and the roof region of a motor vehicle includes a single elastomer profile having an outer front surface, the profile including:

at least one element for sealing the window pane;
at least one element for sealing the region between the upper edge of the door and the roof;
a mounting region having two U-shaped recesses formed therein defining holding lips clamped to projecting sheet metal edges of the frame of the door; and
a reinforcement insert disposed in the profile, surrounding the two U-shaped recesses and extending to the outer front surface of the profile.

7 Claims, 2 Drawing Figures

DEVICE FOR THE SIMULTANEOUS SEALING OF THE WINDOW PANE OF A DOOR AND THE ROOF OF A MOTOR VEHICLE

The invention relates to a device for the simultaneous sealing of the window pane of a door and the region between the upper edge of the door and the roof region of a motor vehicle, including a single profile formed of elastomer material, having a mounting region to be fastened to the door frame, at least one sealing element for the window pane, and a sealing element for the region between the upper edge of the door and the roof.

In the conventional form of such a door seal, the door frame is provided with two projections which extend at a right angle to each other and which are inserted into corresponding recesses in a profile strip, thereby retaining this profile strip by a force-locking as well as a form-locking connection. A formlocking connection is one in which parts are locked together by virtue of their own shapes, while a force-locking connection requires external force. The disadvantage of this construction is the relative difficulty of installing the profile in the door frame, because this method is not suitable for automatic installation by a robot, i.e. the profile cannot be assembled by robots, which are utilized more and more in the automotive industry.

It is accordingly an object of the invention to provide a device for the simultaneous sealing of the window pane of a door and the roof of a motor vehicle, which overcomes the hereinaforementioned disadvantages of the heretofore-known devices of this general type. It is especially an object to provide a sealing device which can be mounted to a motor vehicle door by a robot without difficulty.

With the foregoing and other objects in view there is provided a device for the simultaneous sealing of the window pane of a door and the region between the upper edge of the door and the roof region of a motor vehicle, comprising a single elastomer profile having an outer front surface, the profile including:
 at least one element for sealing the window pane;
 at least one element for sealing the region between the upper edge of the door and the roof;
 a mounting region having two U-shaped recesses formed therein defining holding lips clamped to projecting sheet metal edges of the frame of the door; and
 a reinforcement insert disposed in the profile, surrounding the two U-shaped recesses and extending to the outer front surface of the profile.

In accordance with another feature of the invention, the reinforcement insert is a one-piece steel or aluminum part.

In accordance with a further feature of the invention, the reinforcement insert is a one-piece metal part having a bent end region extending substantially parallel to the outer front surface of the profile and parallel to the window pane.

In accordance with an added feature of the invention, there is provided a decorative strip inserted into the profile in the vicinity of the bent end region of the reinforcement insert.

In accordance with an additional feature of the invention, there is provided a fastening element connecting the reinforcement insert to the door frame.

In accordance with a concomitant feature of the invention, the fastening element is a rivet.

The advantages achieved with the invention lie especially in the fact that the mounting region of the profile strip, which is made of elastomer material, especially rubber, can be clamped onto suitably shaped metal edges of the door frame, an operation which can be performed by a robot without difficulty. In order to generate the required clamping forces, the one-piece steel or aluminum reinforcement insert is provided in the mounting region which surrounds the respective U-shaped recesses of the profile provided with holding lips and extends up to the outer front surface of the profile, i.e. it stiffens the sealing region for the roof, so that even after long usage and/or at high speed usage of the vehicle, sufficient sealing in this region is guaranteed.

This profile can be extruded in one operation including the onepiece reinforcement insert and the decorative strip may be made of stainless steel, anodized aluminum or a correspondingly constructed plastic.

Other features which are considered as characteristic for the invention are set forth in the appended claims.

Although the invention is illustrated and described herein as embodied in a device for the simultaneous sealing of the window pane of a door and the roof of a motor vehicle, it is nevertheless not intended to be limited to the details shown, since various modifications and structural changes may be made therein without departing from the spirit of the invention and within the scope and range of equivalents of the claims.

Figure 2:
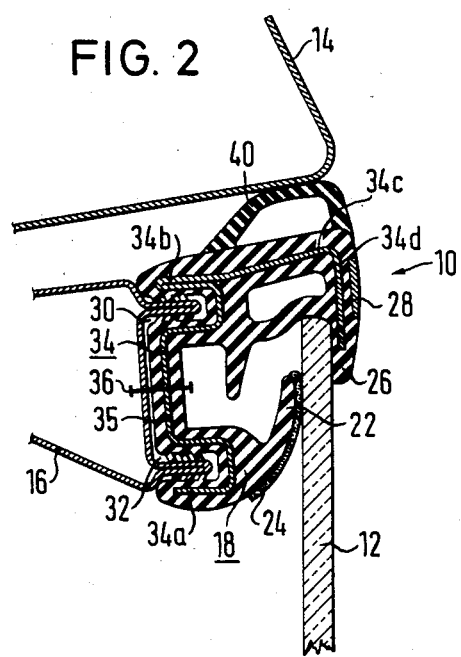

The construction and method of operation of the invention, however, together with additional objects and advantages thereof will be best understood from the following description of specific embodiments when read in connection with the accompanying drawings, in which:

FIG. 1 is a fragmentary, diagrammatic, cross-sectional view of a first embodiment of a sealing device according to the invention; and FIG. 2 is a view similar to FIG. 1 of a modified embodiment, wherein the reinforcement insert is riveted to the door frame.

Referring now to the figures of the drawings in detail and first, particularly, to FIG. 1 thereof, there is seen a sealing device which is indicated as a whole by reference symbol 10. The sealing device has a rubber profile 18, one side of which is fastened to the door frame and the other side of which seals the window pane 12 of the door as well as the roof region 14 of the body of a motor vehicle.

As shown in FIG. 1, sheet metal parts of a door frame 16 are combined in such a way that two stable sheet metal edges are formed. These metal edges are inserted into two U-shaped recesses 30 and 32 in the rubber profile 18, which are provided with holding lips that project toward the inside.

In order to stiffen the rubber profile 18 in the vicinity of the U-shaped recesses, a one-piece reinforcement insert 34 made of aluminum or steel is provided, which encloses the two U-shaped recesses and extends outwardly into the freely exposed front surface of the rubber profile 18. The reinforcement insert 34 has a first U-shaped region 34a which surrounds the U-shaped recess 32, a flat transition region, a second U-shaped region 34b which surrounds the second U-shaped recess 30, a region 34c projecting toward the right side, and finally a bent region 34d.

The upper surface of the rubber profile 18 is provided with sealing lips 20 which lie against the roof region and are made of a softer rubber, such as rubber with a Shore A hardness of 50 to 70.

Additionally, the rubber profile has two other sealing lips 22, 26, the sealing lip 22 lying against the back or inner surface of the window pane 12 and the sealing lip 26 surrounding the window pane from the top and from the front or outer surface. The sealing lip 22 is also provided with a conventional flocking or covering 24 with fibers.

A decorative strip 28 which can be made of anodized aluminum or stainless steel is inserted into the outer front surface of the rubber profile 18.

The above-described rubber profile 18 is produced in a single manufacturing operation, i.e. the reinforcement insert 34 is molded or extruded with the corresponding rubber mixture, while the sealing lips 20 are molded from the other rubber mixture and the decorative strip 28 is simultaneously inserted. As shown in FIG. 1 and FIG. 2, the front surface of the decorative strip 28 is flush with the front surface of tne rubber profile 18, so that there are no production problems.

The embodiment according to FIG. 2 differs from the configuration according to FIG. 1, by the feature that the bridge-like section of the reinforcement insert 34 is not provided, but the two U-shaped regions of the reinforcement insert 34 are instead directly connected with each other. The straight region 35 thus formed runs parallel to and closely adjacent the corresponding region of the door frame 16. In order to even further improve the fastening of the rubber profile 18 to the door frame 16, the reinforcement insert 34 can be fastened to the door frame 16 by a rivet 36 in the straight region 35. This additional fastening operation can be performed by means of a robot which also clamps the rubber profile 18 onto the two metal edges of the door frame 16. Additionally, the sealing lip on the upper surface is in the form of a hollow chamber profile 40, and the reinforcement insert 34d in the sealing lip 26 surrounds the upper edge of the pane 12 over a greater region in FIG. 1, in order to provide a better contact and sealing.

The foregoing is a description corresponding in substance to German Application No. P 34 42 241.2, filed Nov. 19, 1984, the International priority of which is being claimed for the instant application and which is hereby made part of this application. Any material discrepancies between the foregoing specification and the aforementioned corresponding German application are to be resolved in favor of the latter.

I claim:

1. Device for the simultaneous sealing of the window pane of a door and the region between the upper edge of the door and the roof region of a motor vehicle, comprising a one-piece elastomer profile including:
   at least one element for sealing the window pane having a sealing lip gripping around the edge of the window pane and lying against the outer surface of the window pane;
   at least one element for sealing the region between the upper edge of the door and the roof;
   a mounting region having two U-shaped recesses formed therein defining holding lips directly clamped from the outside onto two parallel sheet metal webs of the frame of the door projecting outwardly perpendicular to the frame of the door; and
   a one-piece reinforcement insert disposed in said profile, surrounding said two U-shaped recesses and extending substantially to said sealing lip at an angle.

2. Device according to claim 1, wherein said reinforcement insert is a one-piece steel part.

3. Device according to claim 1, wherein said reinforcement insert is a one-piece aluminum part.

4. Device according to claim 1, wherein said reinforcement insert is a one-piece metal part having a bent end region extending substantially parallel to said outer front surface of said profile and parallel to the window pane.

5. Device according to claim 4, including a decorative strip inserted into said profile in the vicinity of said bent end region of said reinforcement insert.

6. Device according to claim 1, including a fastening element connecting said reinforcement insert to said door frame.

7. Device according to claim 6, wherein said fastening element is a rivet.

* * * * *

UNITED STATES PATENT AND TRADEMARK OFFICE
CERTIFICATE OF CORRECTION

PATENT NO. : 4,656,784
DATED : April 14, 1987
INVENTOR(S) : WALTER BRACHMANN

It is certified that error appears in the above-identified patent and that said Letters Patent are hereby corrected as shown below:

In the title page, item (73), lines 9 and 10,

"Sigri GmbH, Meitingen, Fed. Repl. of Germany"

should read

-- METZELER KAUTSCHUK GmbH, Munich, Fed. Rep. of Germany --.

Signed and Sealed this

Twenty-sixth Day of January, 1988

Attest:

DONALD J. QUIGG

Attesting Officer

Commissioner of Patents and Trademarks